2 Sheets—Sheet 1.

J. G. BAKER.
Grinding-Mill.

No. 220,111. Patented Sept. 30, 1879.

Witnesses
Henry Howson Jr.
Harry Smith

Inventor
John G. Baker
by his Attorneys
Howson and Son

2 Sheets—Sheet 2.
J. G. BAKER.
Grinding-Mill.
No. 220,111. Patented Sept. 30, 1879.
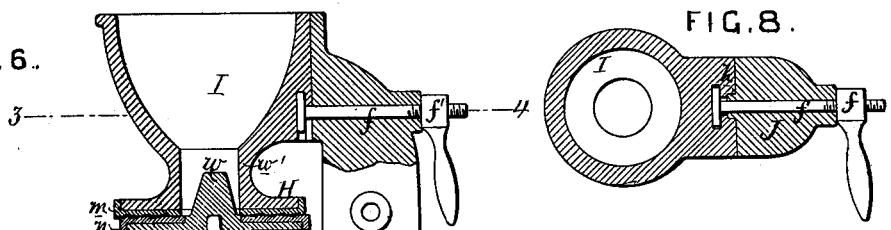
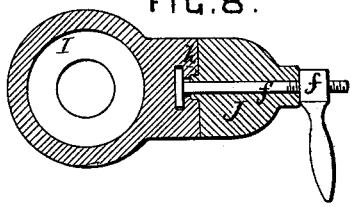
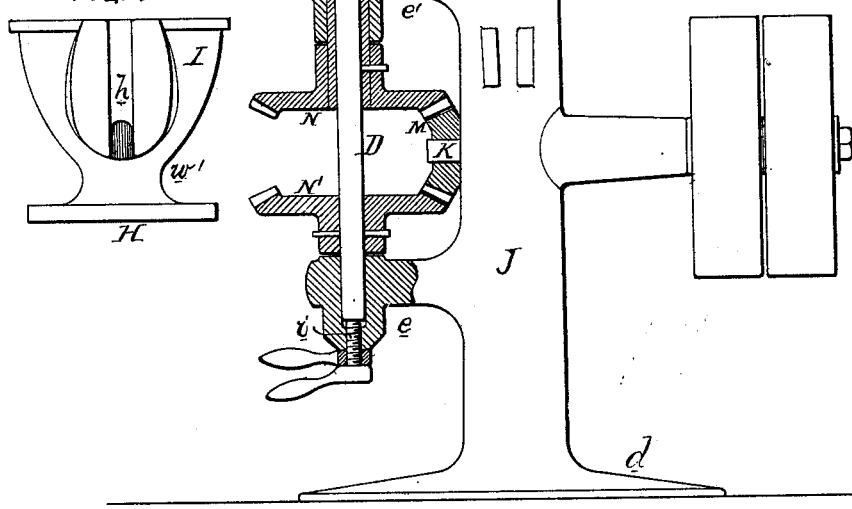
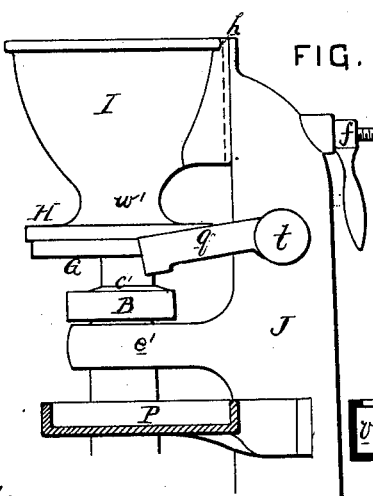
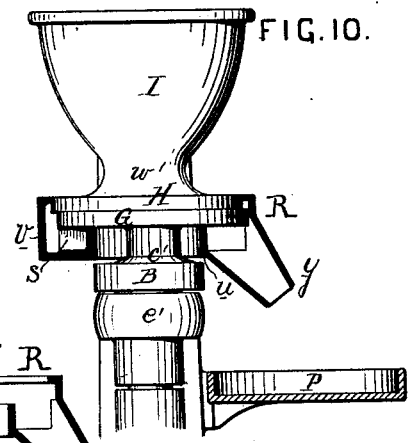
Witnesses
Henry Howson Jr.
Harry Smith
Inventor
John G. Baker
by his Attorneys
Howson and Son
N. PETERS, PHOTO-LITHOGRAPHER, WASHINGTON, D.C.

UNITED STATES PATENT OFFICE.

JOHN G. BAKER, OF PHILADELPHIA, PENNSYLVANIA, ASSIGNOR TO THE ENTERPRISE MANUFACTURING COMPANY, OF SAME PLACE.

IMPROVEMENT IN GRINDING-MILLS.

Specification forming part of Letters Patent No. 220,111, dated September 30, 1879; application filed March 31, 1879.

*To all whom it may concern:*

Be it known that I, JOHN G. BAKER, of Philadelphia, Pennsylvania, have invented a new and useful Improvement in Grinding-Mills, of which the following is a specification.

My invention relates to that class of grinding-mills in which a fixed grinding-surface is combined with a grinder having a planetary movement; and my invention consists of the combination, in a grinding-mill, of a fixed disk with flat grinding-surface, a moving disk, also having a flat surface, a shaft having a crank or eccentric pin, forming the axis of the said moving disk, and a tubular shaft geared to the moving disk by an internally-toothed wheel on one and a pinion on the other, all substantially as described hereinafter.

Figure 1:
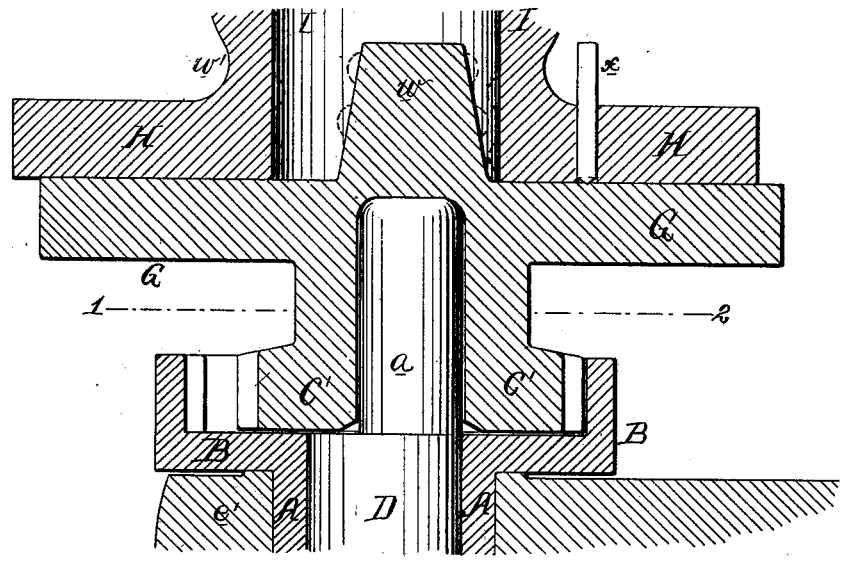
Figure 4:
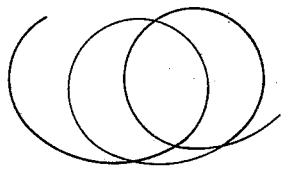
Figure 3:
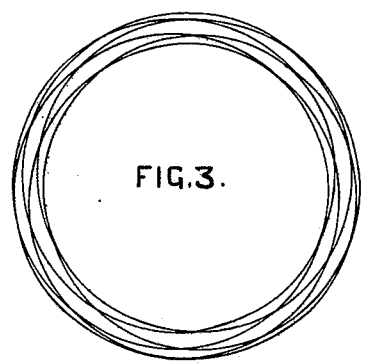
Figure 5:
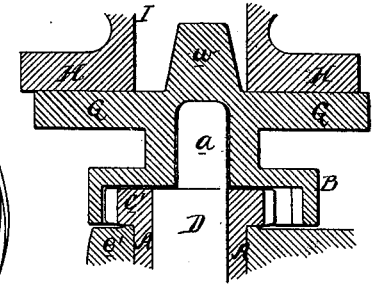
Figure 2:
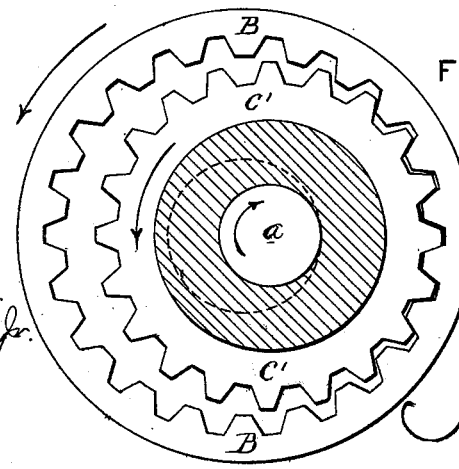

In the accompanying drawings, Figure 1, Sheet 1, is a vertical section of the grinding portion of the mill, showing a means of imparting a planetary motion to one of the grinding-disks; Fig. 2, a sectional plan on the line 1 2; Figs. 3 and 4, diagrams illustrating the grinding effect due to the planetary motion; Fig. 5, a vertical section, showing a modification of Fig. 1; Fig. 6, Sheet 2, a side view, partly in section, of the complete mill; Fig. 7, a rear view of the hopper; Fig. 8, a sectional plan on the line 3 4, Fig. 6; Fig. 9, an exterior view of the upper portion of the mill; Fig. 10, a front view of the upper portion of the mill as arranged for dry grinding; and Fig. 11, a detached view of part of Fig. 10.

The main feature of my invention will be best understood by reference to Sheet 1, Figs. 1, 2, 3, and 4.

A is a tubular shaft, adapted to suitable bearings, referred to hereinafter, and D is an internal shaft, concentric with the shaft A, which has at the top an internal gear-wheel, B. On the upper end of the shaft D is a crank-pin, *a*, which projects into and has its bearing in the hub of the lower grinding-disk, G, this hub terminating below in a pinion, C′, the teeth of which gear into the internal teeth of the wheel B. H is the upper grinding-disk, concentric with the shafts A and D, this disk being, in the present instance, stationary, and forming part of or being secured to the hopper I.

There is a device, referred to hereinafter, for the vertical adjustment of the shaft D, and for maintaining the face of the disk G in proper grinding contiguity with the face of the disk H. If the two shafts A and D be turned, say, in the contrary directions, (pointed out by the arrows in Fig. 2,) the pinion C′ and its grinding-disk G must have two movements, or, rather, a planetary movement, imparted to it—that is to say, it must revolve in the direction of the arrow on its own axis, which is the crank-pin *a*, and must at the same time have another movement due to the eccentricity of the crank-pin *a* in respect to the shafts A and D, the pinion C′ always remaining in gear with the teeth of the internal wheel.

The triturating effect on substances submitted to the combined action of the stationary grinding-disk H and the planetary grinding-disk G may be best explained by supposing a pointed instrument, *x*, (shown in Fig. 1,) to be fitted snugly in an orifice in the stationary disk H, so that its sharp point shall bear on a sheet of soft metal secured to the face of the disk G. On turning the two shafts the figures described by the point of the instrument on the soft-metal plate will be those shown in Fig. 3—that is to say, there will be a continuous succession of scrolls crossing and recrossing each other in an annular path, the breadth of which will be determined by the eccentricity of the crank-pin in respect to the shaft D. In other words, any given point on the disk G will, as the latter moves, constantly change its position on the disk H both circumferentially and radially.

The exaggerated diagram, Fig. 4, may, perhaps, serve to more clearly show the succession of scrolls than the more confused diagram, Fig. 3, which, however, is a correct copy of the actual marks produced on a soft plate in a working-mill, in the manner described above.

Two important results are due to this planetary movement of the disk—first, a thorough and rapid grinding effect on the material submitted to its action; and, second, the free discharge of the ground material from between the grinding-surfaces.

The main frame consists, in the present instance, of a substantial column, J, having an appropriate base, $d$, and from this column projects the bearing $e$ for the lower portion of the shaft D and the bearing $e'$ for the tubular shaft A.

K is the driving-shaft, having a pinion, M, gearing into a bevel-wheel, N, on the tubular shaft, and into a similar wheel, N', on the shaft D.

The hopper I is so secured to the upper end of the column that it may be readily detached therefrom, this being an important feature of my invention, for on raising the hopper both grinding-surfaces are exposed for cleansing purposes, and the grinding-disk G can be at once detached from the crank-pin of the shaft D, to make way for another grinding-disk should a change of material demand a change of grinding-surfaces.

The device for retaining and releasing the hopper consists, in the present instance, of a bolt, $f$, passing through the column, the head of the bolt being adapted to a vertical slot in the hopper, so that, on loosening the nut $f'$ of the bolt, the said hopper will be at liberty. It should be understood that there is in that face of the hopper which fits against the column a vertical groove, $h$, Fig. 8, adapted to a vertical rib on the column, so as to insure a proper adjustment of the hopper and its grinding-disk H in respect to the grinding-disk G.

A set-screw, $i$, passes through the lower portion of the bearing $e$, to adjust the shaft D vertically and insure the proper adjustment of the grinding-disk G to the disk H. The said grinding-disk G should have a slight play on the crank-pin $a$, so that its surface may be self-coinciding with that of the disk H under the pressure imparted by the set-screw $i$.

For ordinary grinding purposes I prefer to use hard cast-iron plates $m$ and $n$, the former being secured to the hopper and the latter forming part of the grinding-disk G, each plate being flanged, as shown, so as to insure a snug fit to its place. It has not been deemed necessary to show the dress of these plates, as it must in many instances vary in accordance with the material operated on.

In grinding paints and other semi-liquid substances, I secure a scraper, $q$, by a set-screw, $t$, to the column J, the end of the scraper bearing against the periphery of the disk G, so as to remove therefrom the ground material which exudes from between the grinding-surfaces and direct the same into a vessel placed on the platform P, secured to and projecting from the column J.

The scraper is elastic, so that it will yield and accommodate itself to the movements of the periphery of the disk G.

It will be seen that the material in the hopper I is directed to the grinding-surface in part by a tapering central projection, $w$, on the grinding-disk G, this projection being in the neck $w'$ of the hopper, in which neck it is constantly changing its lateral position, owing to its planetary movement. It consequently facilitates the feeding of the material to the grinding-surfaces. In some cases I place teeth or knives on this central projection, $w$, and additional teeth or knives on the neck of the hopper, for the purpose of tearing up stalks, roots, and other obstinate materials before they are submitted to the grinding-surfaces, the tearing action of these teeth or knives being enhanced by the lateral as well as rotary movement of the projection.

When the mill has to be used for grinding dry material, I remove the scraper $q$ and secure to the column by the set-screw $t$ an annular casing, R, as shown in Fig. 10, the outer vertical flange, $v$, of this casing being nearly in contact with the edge of the grinding-disk H, and the upper edge of its inner flange, $u$, being nearly in contact with the under side of the disk G, so that the ground material must fall from between the disks into the annular space between the two flanges, and must be swept from this space by a blade, $s$, on the grinding-disk G to the spout $y$.

It is not essential that the gearing shown in Figs. 1 and 2 should be adhered to in order to impart a planetary motion to the grinding-disk G. In the modification shown in Fig. 5, Sheet 1, for instance, the internal gear is on the hub of the disk G and the pinion on the tubular shaft A.

I claim as my invention—

The combination, in a grinding-mill, of a fixed disk, H, with flat grinding-surface, the disk G, having a corresponding surface, the shaft D, having a crank or eccentric pin, $a$, forming the axis of the disk G, and the tubular shaft A, geared to the said disk G by an internally-toothed wheel on one and a pinion on the other, all substantially as set forth.

In testimony whereof I have signed my name to this specification in the presence of two subscribing witnesses.

JOHN G. BAKER.

Witnesses:
HARRY SMITH,
HENRY HOWSON, Jr.